United States Patent
Davis

(10) Patent No.: US 10,453,147 B1
(45) Date of Patent: Oct. 22, 2019

(54) METHODS AND SYSTEMS TO GENERATE PROPERTY INSURANCE DATA BASED ON AERIAL IMAGES

(71) Applicant: STATE FARM MUTUAL AUTOMOBILE INSURANCE COMPANY, Bloomington, IL (US)

(72) Inventor: Timothy Joel Davis, Warrenville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/853,016

(22) Filed: Sep. 14, 2015

Related U.S. Application Data

(60) Provisional application No. 62/064,138, filed on Oct. 15, 2014.

(51) Int. Cl.
| | | |
|---|---|---|
| *G06Q 40/08* | (2012.01) | |
| *G06Q 50/16* | (2012.01) | |
| *G06K 9/00* | (2006.01) | |
| *G06T 7/60* | (2017.01) | |
| *G06T 7/40* | (2017.01) | |

(52) U.S. Cl.
CPC ......... *G06Q 40/08* (2013.01); *G06K 9/00637* (2013.01); *G06Q 50/163* (2013.01); *G06T 7/40* (2013.01); *G06T 7/602* (2013.01); *G06T 2207/10032* (2013.01)

(58) Field of Classification Search
CPC .............................................. G06Q 40/00–08
See application file for complete search history.

(56) References Cited

U.S. PATENT DOCUMENTS

| | | | | |
|---|---|---|---|---|
| 8,229,769 B1* | 7/2012 | Hopkins, III | ...... | G06Q 10/0635 382/100 |
| 8,346,578 B1* | 1/2013 | Hopkins, III | .......... | G06Q 40/00 382/100 |
| 8,515,125 B2* | 8/2013 | Thornberry | ........ | G06K 9/00637 382/100 |
| 8,818,572 B1* | 8/2014 | Tofte | ..................... | B64C 39/024 244/75.1 |
| 9,152,863 B1* | 10/2015 | Grant | ..................... | G06Q 40/08 |
| 9,875,509 B1* | 1/2018 | Harvey | .................. | G06Q 40/08 |
| 9,928,553 B1* | 3/2018 | Harvey | .............. | G06K 9/00637 |

(Continued)

OTHER PUBLICATIONS

Hill, Kashmir, "Congress welcomes the drones" Forbes.com (http://www.forbes.com/sites/kashmirhill/2012/02/07/congresswelcomesthedrones/#74a6a5fd5e28) Feb. 2, 2012.*

(Continued)

*Primary Examiner* — Narayanswamy Subramanian

(74) *Attorney, Agent, or Firm* — Marshall, Gerstein & Borun LLP; Randall G. Rueth

(57) ABSTRACT

The present disclosure generally relates to methods and systems to generate property insurance data based on aerial images. The property insurance data is representative of property insurance information. The aerial images may be obtained using a digital camera attached to an unmanned drone. The aerial images may be obtained when a camera is less than five-hundred feet from a property. The property insurance data may be generated based on a series of images taken at different points in time.

17 Claims, 9 Drawing Sheets

(56) References Cited

U.S. PATENT DOCUMENTS

| | | | | |
|---|---|---|---|---|
| 2009/0265193 A1* | 10/2009 | Collins | .............. | G06Q 30/0185 |
| | | | | 705/4 |
| 2012/0311053 A1* | 12/2012 | Labrie | ................. | G06F 17/5004 |
| | | | | 709/206 |
| 2013/0211790 A1* | 8/2013 | Loveland | ........... | G06K 9/00637 |
| | | | | 703/1 |
| 2013/0226624 A1* | 8/2013 | Blessman | .............. | G06Q 40/08 |
| | | | | 705/4 |
| 2013/0262029 A1* | 10/2013 | Pershing | ................ | G06Q 10/06 |
| | | | | 702/156 |
| 2014/0019166 A1* | 1/2014 | Swanson | ................ | G06Q 40/08 |
| | | | | 705/4 |
| 2014/0089045 A1* | 3/2014 | Johnson | ............. | G06Q 30/0205 |
| | | | | 705/7.31 |

OTHER PUBLICATIONS

"Hitachi Software and Pictometry Sign Marketing Agreement; Hitachi HouseDiff Change Detection Process Combines With Pictonnetry's Change Analysis Software and Imagery for Evaluating Real Property Changes" Nov. 1, 2004, Business Wire, pp. 1-3.*

"Hitachi Software and Pictometry Sign Marketing Agreement; Hitachi HouseDiff Change Detection Process Combines With Pictometry's Change Analysis Software and Imagery for Evaluating Real Property Changes" Nov. 1, 2004, Business Wire, pp. 1-3 (Year: 2004).*

* cited by examiner

METHODS AND SYSTEMS TO GENERATE PROPERTY INSURANCE DATA BASED ON AERIAL IMAGES

CROSS REFERENCE TO RELATED APPLICATIONS

This application claims priority, under 35 U.S.C. § 119, to U.S. provisional patent application S/N: 62/064,138, entitled METHODS AND SYSTEMS TO GENERATE PROPERTY INSURANCE DATA BASED ON AERIAL IMAGES, filed Oct. 15, 2014, the entire disclosure of which is incorporated herein in its entirety by reference thereto.

TECHNICAL FIELD

The present disclosure generally relates to methods and systems to generate property insurance data. More particularly, the present disclosure relates to generating property insurance data based on aerial images.

BACKGROUND

Currently, agent-based property inspection processes examine a portion of properties during an insurance acquisition process. Property re-inspection processes typically target certain properties at a later date to examine the properties for insurance underwriting issues (e.g., a change in insurance risk and property value characteristics). Agent-based property inspections are expensive and time consuming.

While satellite and high-level aircraft images of properties are available to a limited degree, satellite and high-level aircraft images of properties are typically not available "on demand." Furthermore, satellite and high-level aircraft images typically do not include enough detail to provide information for insurance purposes (e.g., detail related to hail damaged property, wind damage to roofing, etc.) because federal aviation administration (FAA) regulations require aircraft to maintain a minimum of one-thousand feet clearance above any structures. Thus, comparison of a series of satellite and high-level aircraft images taken over a period of time typically do not provide enough detail to compare, for example, an initial property image with a subsequent property image to, for example, determine property changes. Moreover, satellite and high-level aircraft images are expensive.

Multiple issues arise in relation to using satellite and high-level aircraft images for insurance purposes. Not only are these options expensive in comparison with traditional Agent-based inspections, the technologies rely on aerial image data that is not updated frequently enough to use in automatic insurance underwriting decisions. The technologies rely on data that is not sufficiently nation-wide to use for all insured properties. The technologies rely on data that often times entail unmanageable contractual usage restrictions, and often rely on data that is updated too unpredictably and by too many incompatible vendors (e.g., government and private) technologies. Thus, future availability and accuracy of data cannot be adequately ensured for establishing repeatable and consistent insurance business processes.

Systems and methods are need to provide low-cost, high-resolution, aerial images of property. Systems and methods are needed for property insurance risk characteristic determination and for property change detection based on aerial images.

SUMMARY

A computer implemented method for generating property insurance data may include receiving, at a processor of a computing device, image data in response to the processor executing an image data receiving module, wherein the image data is representative of a series of aerial images of property, wherein individual aerial images of the series of aerial images are taken at different points in time, and, wherein the aerial image data is representative of at least one aerial image that is acquired by an imaging device less than five-hundred feet above the property. The method may also include generating, using a processor of a computing device, property change data, based on the image data, in response to the processor executing a property change data generation module, wherein the property change data is representative of changes in the property from a first point in time associated with a first aerial image and a second point in time corresponding to a second aerial image. The method may further include generating, using a processor of a computing device, property insurance data, based on the property change data, in response to the processor executing a property insurance data generation module.

In another embodiment, a system for generating property insurance data may include an aerial image data receiving module stored on a memory that, when executed by a processor of a computing device, causes the processor to receive aerial image data, wherein the aerial image data is representative of at least one aerial image of property. The system may also include a property insurance data receiving module stored on a memory that, when executed by a processor of a computing device, causes the processor to receive property insurance data, wherein the property insurance data is representative of at least one property insurance policy. The system may further include a property insurance correlation module stored on a memory that, when executed by a processor of a computing device, causes the processor to correlate at least one aerial image with the at least one property insurance policy. The system may yet further include an aerial image data analysis module stored on a memory that, when executed by a processor of a computing device, causes the processor to generate property change data based on the aerial image data, wherein the property change data is representative of at least one physical characteristic of the property. The system may also include a property insurance data generation module stored on a memory that, when executed by a processor of a computing device, causes the processor to generate property insurance data, based on the property change data.

In a further embodiment, a non-transitory computer-readable medium storing instructions that, when executed by a processor of a computing device, cause the processor to generate property insurance data may include an aerial image data receiving module that, when executed by a processor of a computing device, causes the processor to receive aerial image data, wherein the aerial image data is representative of at least one aerial image of property associated with an insurance policy and wherein the at least one aerial image is acquired by an imaging device less than five-hundred feet from the property. The non-transitory computer-readable medium may further include an aerial image data analysis module that, when executed by a processor of a computing device, causes the processor to generate property change data based on the aerial image data, wherein the property change data is representative of at least one physical characteristic of the property.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
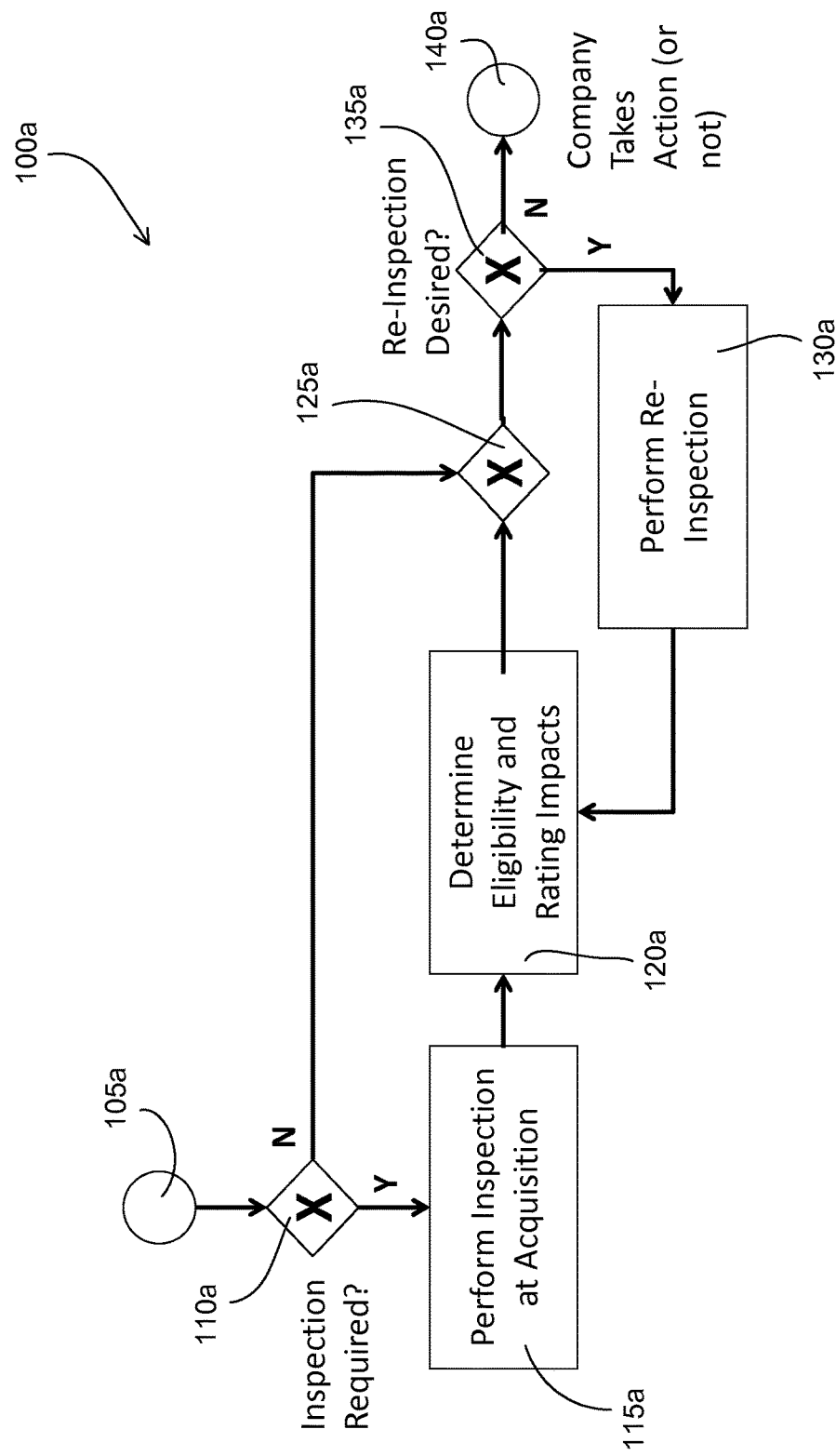
FIG. 1A depicts a flow diagram for an example inspection-based insurance risk assessment of a property.

Recently, aerial imagery, obtained from, for example, a digital camera attached to an unmanned drone, has become available. With use of remote control and remote viewing, aerial images can be obtained with a camera as close as, for example, a foot of an associated property. Furthermore, using a camera attached to an unmanned drone, for example, aerial images can be obtained inexpensively and on-demand. Unmanned drone aircraft present a low-cost alternative to current airplane-based technologies related to acquiring aerial image data. Satellite and high-level aircraft images typically do not include enough detail to provide information for insurance purposes (e.g., detail related to hail damaged property, wind damage to roofing, etc.) because federal aviation administration (FAA) regulations require aircraft to maintain a minimum of one-thousand feet clearance above any structures. Thus, comparison of a series of satellite and high-level aircraft images taken over a period of time typically does not provide enough detail to compare, for example, an initial property image with a subsequent property image to, for example, determine property changes. Moreover, satellite and high-level aircraft images are expensive. As a result, aerial images taken below one-thousand feet, and preferably below five-hundred feet are advantageous for insurance purposes. A digital camera attached to an unmanned drone, for example, provides a cost effective mechanism to frequently (e.g., monthly, quarterly, semi-annually, annually, when ownership of a property is transferred, or when a new insurance policy is requested) obtain a series of aerial images. Aerial images of properties may be taken from multiple perspectives and may be taken using a high-resolution camera, attached to an unmanned drone, to obtain data representative of property wear (e.g., shingle damage and/or wear, siding damage and/or wear, paint damage and/or wear, window damage, window frame damage and/or wear, driveway damage and/or wear, eaves trough condition, etc.). Thereby, an insurance policy may be based on a condition in which a property is maintained.

Digital image analysis software may be used to extract information from a digital image for property insurance related purposes. For example, automated property change detection software may be based on aerial imaging of properties. Aerial imaging technologies may be used for assessing insurance claims in, for example, such applications as roof measurements following hail damage events. Aerial imaging analysis technologies may be used for property insurance rating, property insurance underwriting and property insurance analytics applications.

Systems and methods of the present disclosure may acquire digital aerial image data from any one of a number of sources (e.g., unmanned drone aircraft or other image-capturing aerial technology). The systems and methods of the present disclosure may use digital aerial image data to perform insurance assessment of, for example, all properties in a limited geographical area (e.g. one zip/postal code) during a limited period of time (e.g. one week). Thereby, the systems and methods of the present disclosure may provide various insurance business processes with actionable information in a timely way for simultaneous use in, for example, the following applications: change detection on a risk, virtual inspections of new property insurance business, virtual property re-inspections of existing insurance business (e.g., for insurance policy renewal automation), virtual property "pre-inspections" of prospective insurance business (e.g., fraud prevention), to aid in identification of property or insurance liability hazards, measurement of defensible space for wildfire exposures, measurement of distance to changing coastlines or riverbanks including seasonal or post-disaster differences (i.e., before mapping services reflect the altered topography), verification of dwelling characteristics (e.g. roof type, siding, roof size, etc.)—potentially used to automate roof-related claims rather than requiring visits from adjusters and/or the purchase of new roof image data, verification of roof shape for wind mitigation, validation of the results of other, traditional property inspection results (e.g., from property inspections from Agents or 3rd Party vendors), and identification of unreported property losses (e.g., property losses while with a prior insurance carrier in the case of new insurance business, or with existing insurance business).

Simultaneous information gathering and automated insurance company action, based on aerial image data, represents a significant insurance process/method enhancement. Insurance processes that are currently difficult to automate may be automated at a greater scale than previously possible, based on the timing and multi-use nature of aerial image data. Use of unmanned drone aircraft for any of the specific applications described herein may be employed throughout the insurance industry. Other, technologies (e.g., property change detection software, digital cameras, geometrical calculation software, underwriting models, etc.) may be used in conjunction with aerial image data. Thus, "pre-inspections" may be a new process for the insurance industry.

Availability of high quality digital images and associated data may result in an increase in automation of insurance transactions (e.g., insurance transactions for both insurance acquisition and insurance service) that typically require human intervention or verification of property characteristics. Virtual "pre-inspections" may serve as an aid in preventing insurance fraud, as all insurance application requests in, for example, a given geographic area, and within a given timeframe (e.g., a timeframe following an area-wide image survey) may be evaluated against, for example, aerial image data captured to identify existing unrepaired damage to properties that could otherwise serve as a basis for an unjustified insurance claim from a new insurance policy owner (e.g., in a scenario in which insurance coverage is bound before a "normal" inspection takes place).

Images and image data may serve as input to knowledge-based systems that manage insurance policy renewals. For example, if relevant and timely information is available for entire geographical areas at a time, physical re-inspections may be required less often in order to maintain optimal underwriting results. An insurance policy change transaction may be evaluated with recent, relevant images as input, leading toward potential increases in automation of approval of those insurance transactions, without human intervention, supporting documents or property visitation.

Timing and geographic scope in which "aerial property insurance risk assessment" is performed may be linked to such factors as, organizational capacity (e.g., if analysis of images is performed manually for any reason), "problem" areas (e.g., new housing developments not yet included in, rural areas not frequented by Agents or Agent Staff for visual recognition of changes in risk), or according to a comprehensive, nation-wide schedule that allows for assessment of every insured or insurable risk within an acceptable timeframe.

Insurance claims involving roof damage, for example, if received within a relatively short period of time following an aerial risk assessment, may be settled automatically based on a measurement of roof square footage and identification of roof materials using aerial image data. "Pre-inspection" and unreported loss identification through use of aerial images and associated property details may be provided to insurance carriers, enabling the insurance carriers to gain efficiencies in automation.

Turning to FIG. 1A, a flow diagram for an example aerial image-based insurance risk assessment of a property 100a is depicted. A new non-tenant homeowner insurance applicant request 105a, for example, may be subject to a physical property and liability inspection 115a if they meet (or fail to meet) certain criteria as determined in block 110a. For example, if the customer has indicated they have a solid fuel stove, a physical inspection 115a may occur before an insurance policy is issued. In other cases, a predictive model 110a may be used to determine whether an inspection is necessary. Thus, certain properties may not be subject to inspection (i.e., insurance Agents may be responsible for conducting inspections on new insurance business) as reflected by a transition from block 110a to block 125a. Results of a property inspection, if one occurs, may be feed into insurance underwriting operations systems and centers, where determinations are made about what to do if the inspection revealed any problems (block 120a). At some later date, for example, an insurance company may opt to re-inspect properties 130a which the insurance company currently insures based on a determination that a property should be re-inspected (block 135a). These inspections may, for example, result in adjusted premiums, non-renew decisions, or no action (block 140a). A re-inspection may be performed as an audit of an existing book of business to ensure that a correct insurance premium is being collected to match insurance risk, as well as to clear out "bad" properties which may have initially met the underwriting criteria when an associated insurance policy was sold.

Figure 1B:
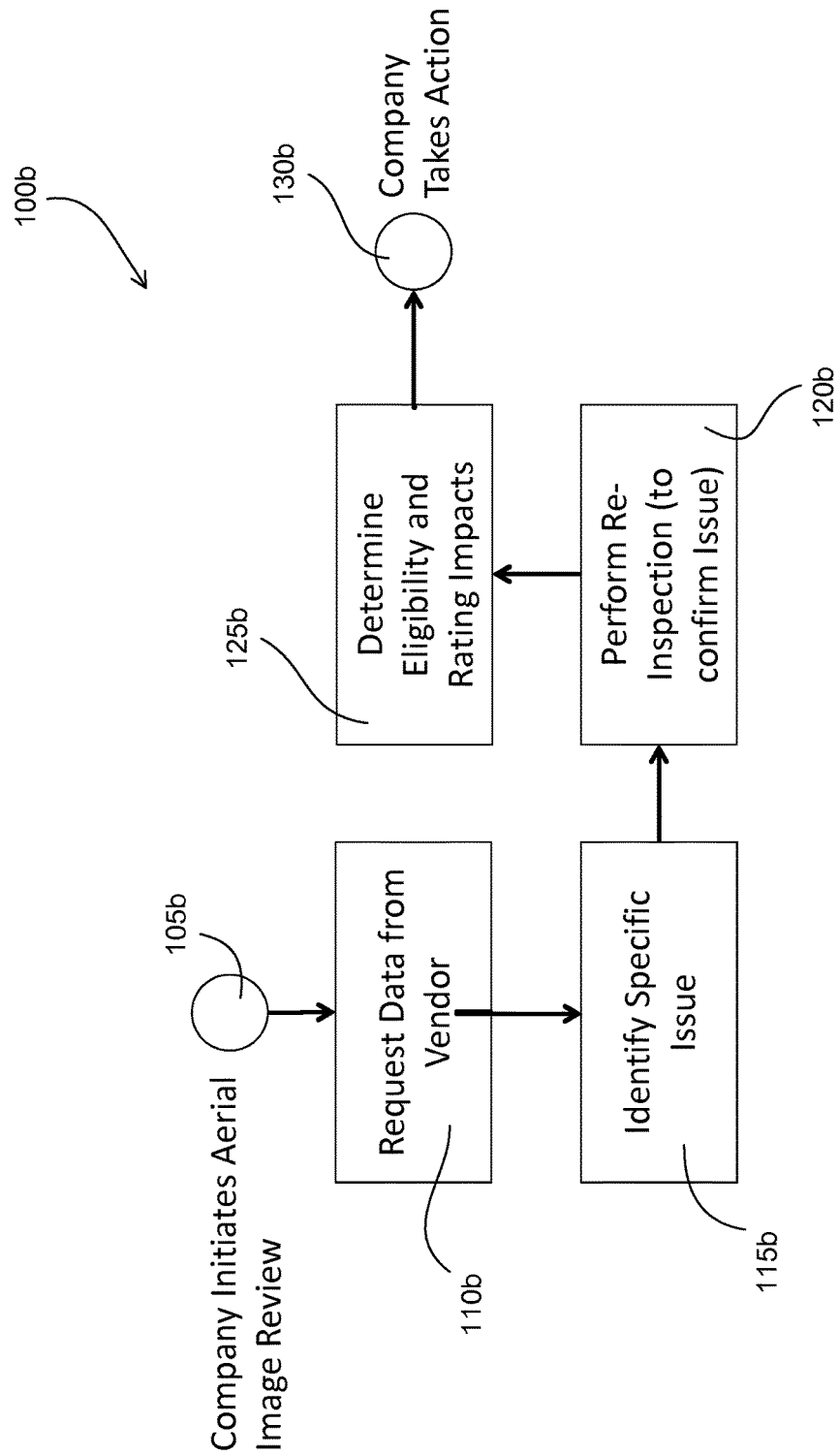
FIG. 1B depicts a flow diagram for an example aerial image-based insurance risk assessment of a property.

With reference to FIG. 1B, a flow diagram for an example aerial image-based insurance risk assessment of a property 100b is depicted. If aerial imagery was desired by the company (block 1005b), vendor services may be utilized—either on an as-needed basis, or in a blanket manner according to service agreements (block 110b). The resulting aerial images may have single-usage restrictions (i.e. do not become insurance company property to do with as they will for multiple applications through time). The aerial images may be pre-analyzed from the vendor—for example, with results from running change detection software to identify potential concerns (block 115b). Flagged concerns may serve as a basis for insurance underwriters to order re-inspections if the insurance underwriters agree with the flagged items (block 120b). These inspections may be conducted and the issues identified in the aerial imagery either confirmed or denied (block 125b). Once this information returned to the insurance underwriter, further decisions (as outlined above) could be made and action taken (block 130b).

Figure 1C:
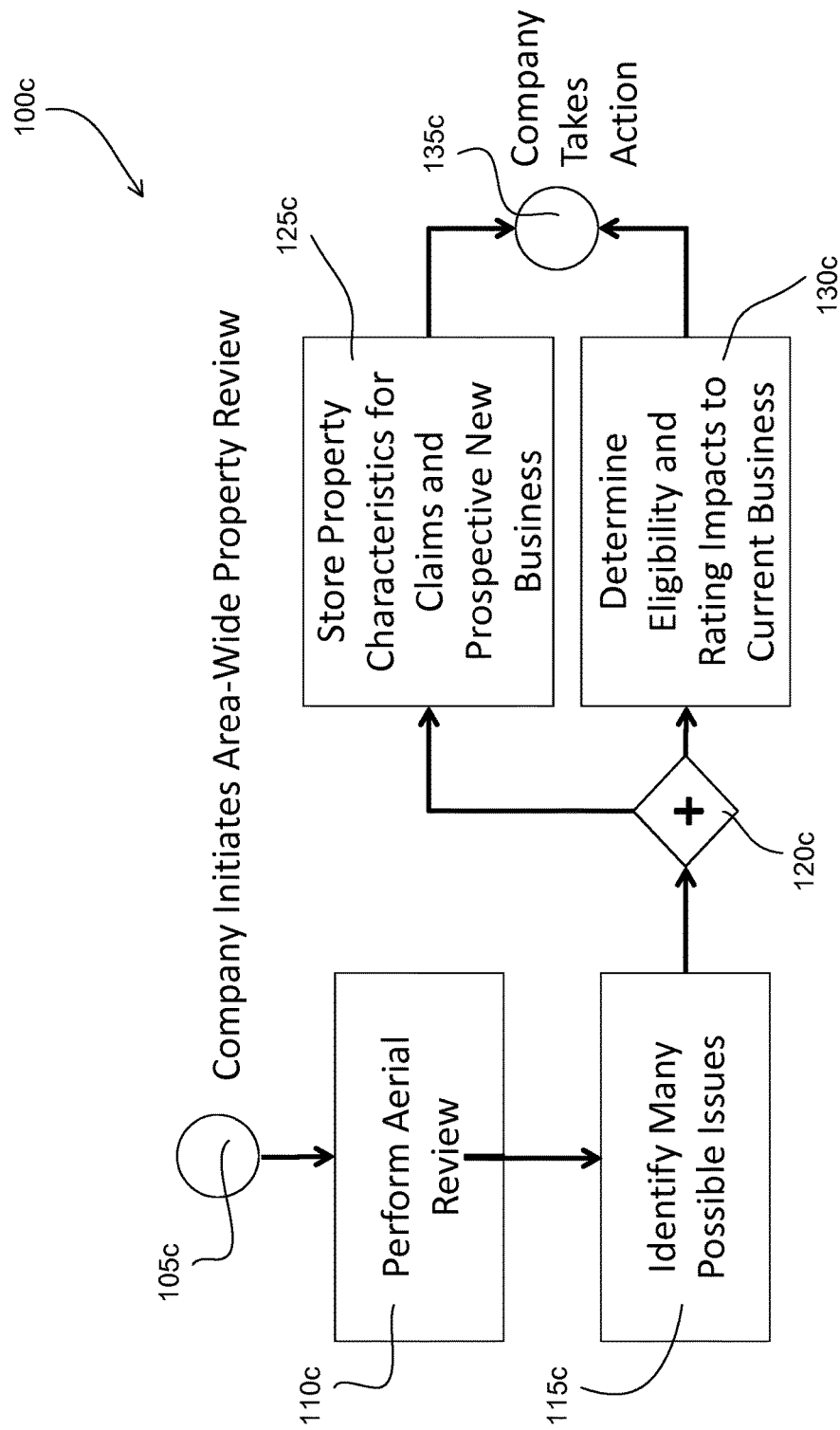
FIG. 1C depicts a flow diagram for an example insurance risk assessment of a property.

Turning to FIG. 1C, a flow diagram for an example insurance risk assessment of a property 100c is depicted. In the method 100c, aerial image-gathering may be initiated in-house (from the PCU-S area, for example) based either on time triggers (to achieve full coverage of all insured properties) or on an as-needed basis (to target geographical areas of concern) (block 105c). An area-specific aerial survey may take place, taking new, company-owned aerial images of insured properties from overhead and orthogonal angles, using spatial mapping technologies (latitude/longitude identification, Geographic Information Systems) to associate images to particular risk location addresses (block 110c). The aerial images may be acquired by, for example, a digital camera attached to an unmanned drone. A "super-set" of image-based data may be compiled from the new images (block 125c). For example, running a change-detection on images, compared to images gathered during a previous survey. The super-set may be made available to any party that subscribes to the surveys (for example: PCU-S, insurance claims, PCA) so that each may receive whatever value out of the images and data that apply to their area of interest. Some consumers of the aerial images and data may subscribe so that the consumer may take immediate, systematic action. The action may include a square footage measurement that is different from what the company previously had on record (block 115c). Tasks for insurance Agents may be automatically generated (block 120c): for example, to assist insurance customers with a needed alterations to an associated insurance policy if some change was needed to avoid adverse insurance underwriting action (block 130c). Some consumers of the images and data may subscribe so that the consumer may take event-based, systematic action (block 135c). For example, insurance claims may automatically generate a hail damage claim estimate based on roof shape, material and square footage without requiring a physical presence of a claims adjuster to verify those characteristics (this is also accomplished now through certain vendor tools). Property "pre-inspections" may be accomplished by capturing associated aerial image data for properties in a given geographic area in addition to those already insured. Property inspections, if recent enough, may be used as a proxy for a physical property and liability inspection that may otherwise be required at a time of new insurance business acquisition.

Figure 2A:
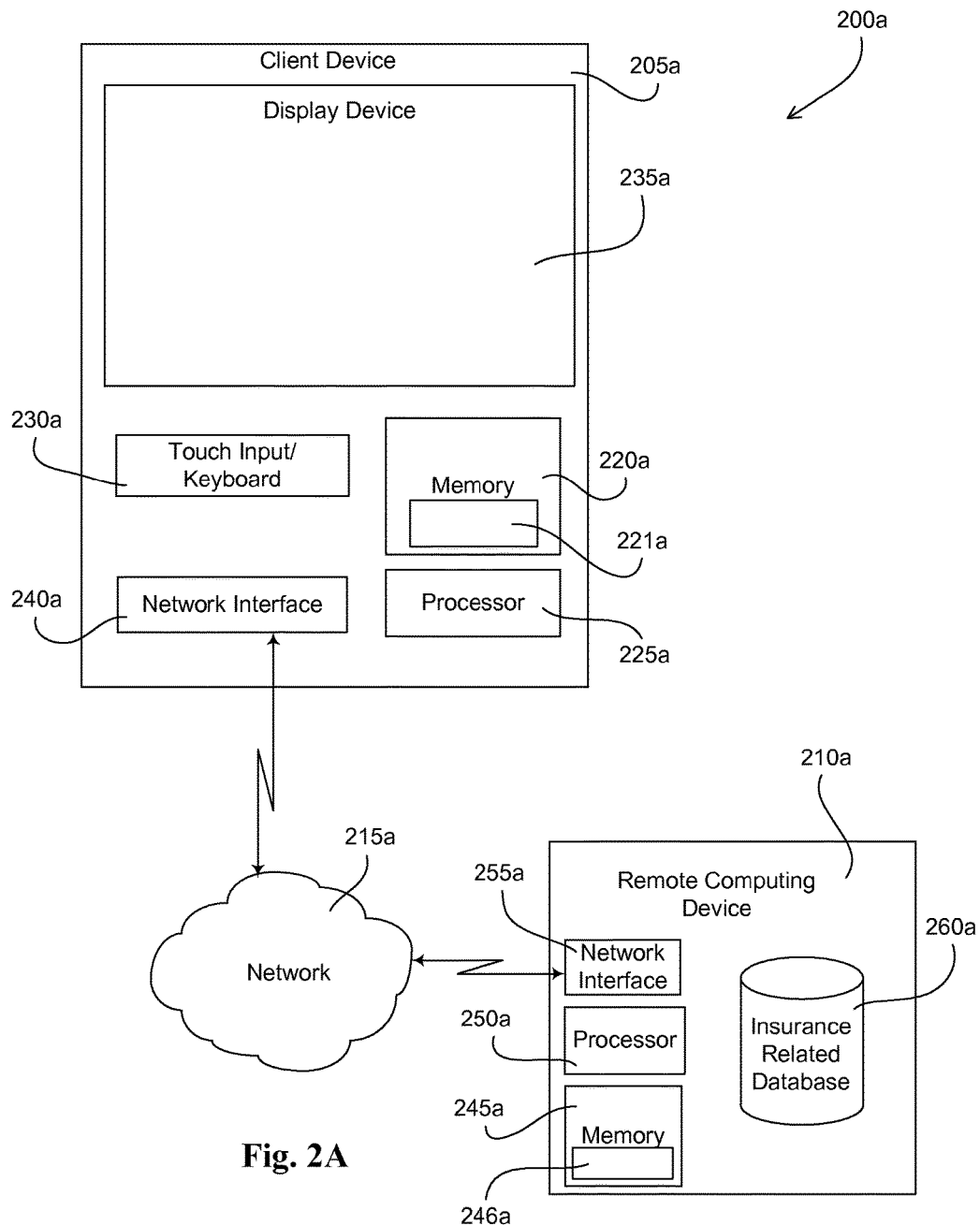
FIG. 2A depicts a block diagram of an example system for generating property insurance data based on aerial images.

With reference to FIG. 2A, a computer system for generating property insurance data based on aerial images 200a may include a client device 205a in communication with a remote computer device (e.g., a server) 210a via a network 215a. A computer system 200a may implement communications between a client device 205a and a remote computing device 210a (e.g., a remote server) to provide, for example, aerial image data to an insurance related database 260a. For example, a computer system 200a may acquire aerial image data from, for example, a user of a client device 205a (e.g., a digital camera attached to an unmanned drone). As described in detail herein, a computer system 200a may generate property insurance data based on aerial images.

For clarity, only one client device 205a is depicted in FIG. 2A. While FIG. 2A depicts only one client device 205a, it should be understood that any number of client devices 205a may be supported and that each client device 205a may be any appropriate computing device, such as a mobile telephone, a personal data assistant, a tablet or a lap-top computer having a digital camera (not shown in FIG. 2A). A client device 205a may include a memory 220a and a processor 225a for storing and executing, respectively, a module 221a. The module 221a, stored in the memory 220a as a set of computer-readable instructions, may be related to an application for generating property insurance data based on aerial images that, when executed on a processor 225a, causes data representative of property insurance characteristics based on aerial images to be stored in the memory 220a. As described in detail herein, the module 221a may facilitate interaction between an associated client device 205a and a remote computing device 210a. The processor 225a, further executing the module 221a, may facilitate communications between a remote computing device 210a and a client device 205a via a network interface 240a and a network 215a.

A client device 205a may include a display device 235a which may be any type of electronic display device such as a liquid crystal display (LCD), a light emitting diode (LED) display, a plasma display, a cathode ray tube (CRT) display, or any other type of known or suitable electronic display. A display device 235a may exhibit a display which depicts a user interface for configuring a client device 205a to communicate with a remote computing device 210a. A client device 205a may include a user input device 230a, such as a touch input/keyboard/pointing device (e.g., a mouse) that provides a mechanism for a user of the client device 205a to launch a client device insurance application and, for example, to interact with a system for generating property insurance data based on aerial images. The user input device 230a may be configured as an integral part of a display device 235a, such as a touch screen display device. The network interface 240a may be configured to facilitate communications between a client device 205a and a remote computing device 210a via any wireless communication network 215a, including for example a wireless LAN, MAN or WAN, WiFi, the Internet, or any combination thereof. Moreover, a client device 205a may be communicatively connected to a remote computing device 210a via any suitable communication system, such as via any publicly available or privately owned communication network, including those that use wireless communication structures, such as wireless communication networks, including for example, wireless LANs and WANs, satellite and cellular telephone communication systems, etc. A client device 205a may cause, for example, manual answer data to be transmitted to, and stored in, for example, a remote server 210a memory 245a and/or a remote insurance related database 260a.

A remote computing device 210a may include a memory 245a and a processor 250a for storing and executing, respectively, a module 246a. The module 246a, stored in the memory 245 as a set of computer-readable instructions, may facilitate applications related to generating property insurance data based on aerial images. The module 246a may also facilitate communications between the remote computing device 210a and a client device 205a via a network interface 255a and the network 215a and other functions and instructions.

A remote computing device 210a may be communicatively coupled to an insurance related database 260a. While the insurance related database 260a is shown in FIG. 2A as being communicatively coupled to the remote computing device 210a, it should be understood that the insurance related database 260a may be located within separate remote servers (or any other suitable computing devices) communicatively coupled to the remote computing device 210a. Optionally, portions of insurance related database 260a may be associated with memory modules that are separate from one another, such as a memory 220a of a client device 205a.

Figure 2B:
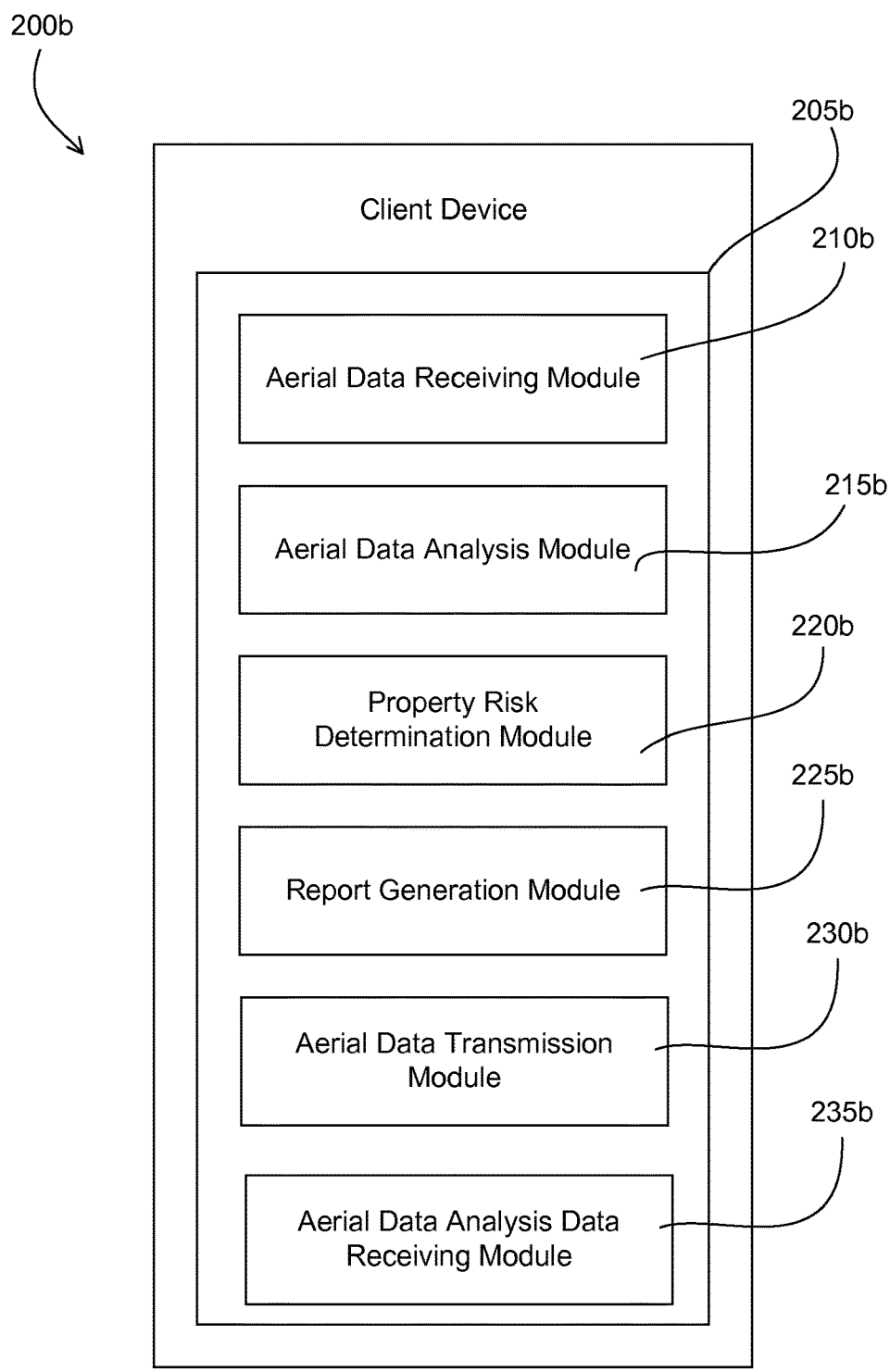
FIG. 2B depicts a block diagram of an example client device.

Turning to FIG. 2B, a client device 200b may include an aerial image data receiving module 210b, an aerial image data analysis module 215b, a property risk determination module 220b, a report generation module 225b, an aerial image data transmission module 230b, and an aerial data analysis data receiving module 235b stored on, for example, a memory 205b. The client device 200b may be similar to the client device 205a of FIG. 2A.

Figure 2C:
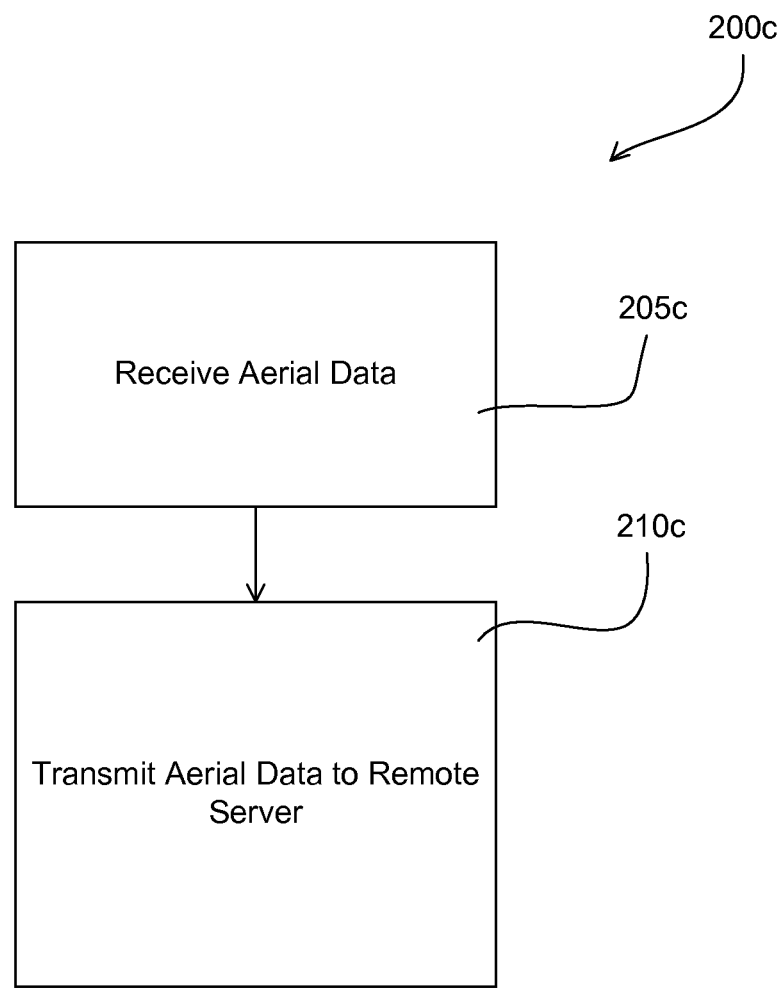
FIG. 2C illustrates a flow diagram for an example method of receiving and transmitting aerial image data.

With reference to FIG. 2C, a method of receiving and transmitting aerial image data 200c may be implemented by a processor (e.g., processor 225a of client device 205a of FIG. 2A) executing, for example, modules 210b and 230b of FIG. 2B. In particular, processor 225a may execute an aerial image data receiving module 210b to receive aerial image data from, for example, a digital camera attached to an unmanned drone (block 205c). Processor 225a may execute an aerial image data transmission module 230b to transmit aerial image data from, for example, a client device (e.g., client device 205a of FIG. 2A) to, for example, a remote computing device (e.g., remote computing device 210a of FIG. 2A) (block 210c). The processor 225a may execute an aerial data analysis data receiving module 235b to receive aerial data analysis data at, for example, a client device (e.g., client device 205a of FIG. 2A) from, for example a remote computing device (e.g., remote computing device 210a of FIG. 2A). The processor 225a may execute a report generation module 225b to cause the processor 225a to generate a property insurance report based, for example, on aerial image data analysis data. Digital image analysis software may be used to extract information from a digital image for property insurance related purposes. For example, automated property change detection software may be based on aerial imaging of properties. Aerial imaging technologies may be used for assessing insurance claims in, for example, such applications as roof measurements following hail damage events. Aerial imaging analysis technologies may be used for property insurance rating, property insurance underwriting and property insurance analytics applications.

Figure 2D:
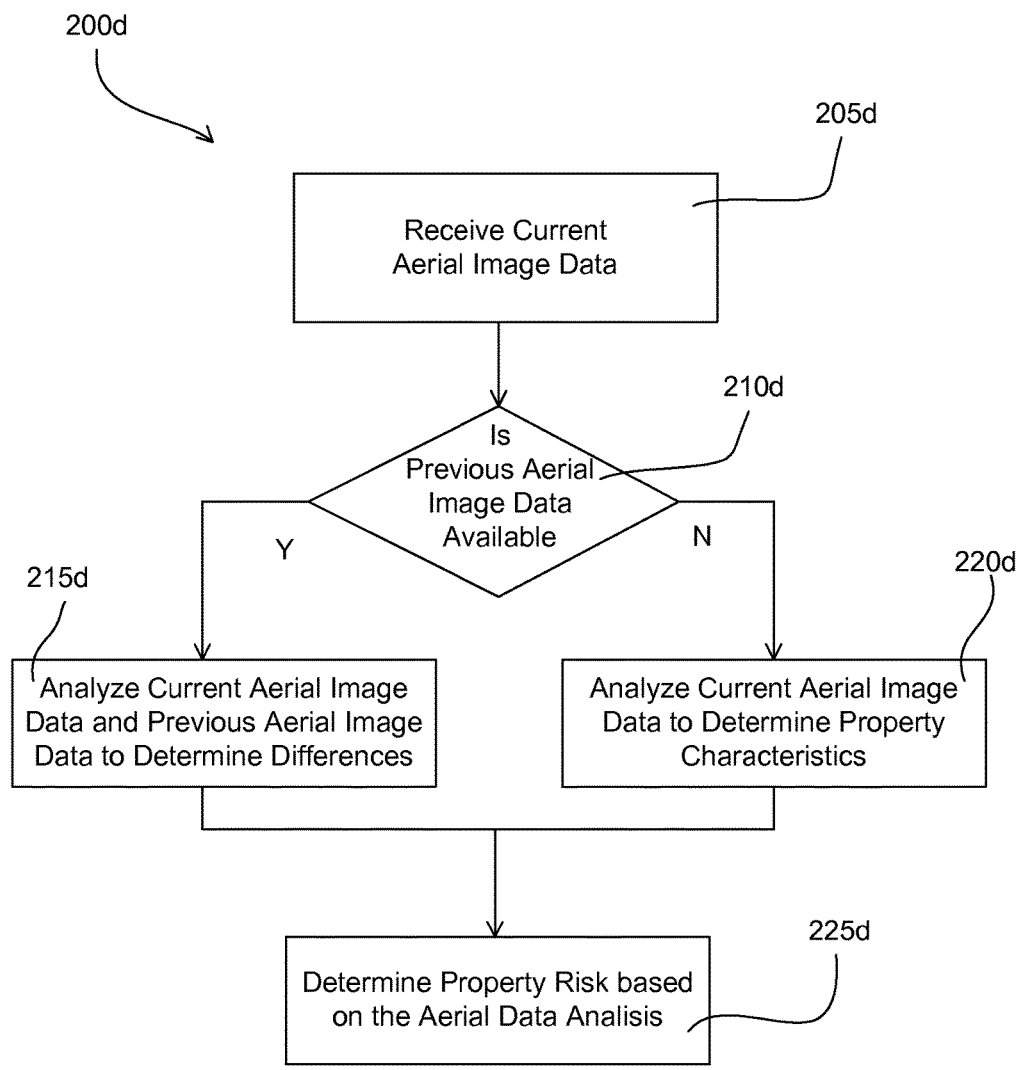
FIG. 2D depicts a flow diagram for an example method of receiving aerial image data, analyzing aerial image data and transmitting aerial image data.

Turning to FIG. 2D, a method of receiving aerial image data, analyzing aerial image data and transmitting aerial image data 200d may be implemented by a processor (e.g., processor 225a of client device 205a of FIG. 2A) executing, for example, modules 210b-230b of FIG. 2B. Alternatively, at least a portion of the method 200d may be performed by a processor (e.g., processor 250a of the remote server 210a of FIG. 2A) executing, for example, modules 210e-230e of FIG. 2E. In particular, processor 225a may execute an aerial image data receiving module 210b to receive current aerial image data at, for example, a (e.g., client device 205a of FIG. 2A) from, for example, a digital camera attached to an unmanned drone (block 205d). Alternatively, processor 250a may execute an aerial image data receiving module 210e to receive aerial image data at, for example, a remote computing device (e.g., remote computing device 210a of FIG. 2A) from, for example, a client device (e.g., client device 205a of FIG. 2A) (block 205d). Processor 225a may determine whether previous aerial image data is available (block 210d). Alternatively, processor 250a may determine whether previous aerial image data is available (block 210d). If the processor 225a, 250a determines that previous aerial image data is available (block 210d), the processor 225a, 250a may execute an aerial image data analysis module 215b, 215e, respectively, to, for example, generate property change data based on, for example, aerial image data (block 215d). If the processor 225a, 250a determines that previous aerial image data is not available (block 210d), the processor 225a, 250a may execute an aerial image data analysis module 215b, 215e, respectively, to, for example, generate property characteristic data based on, for example, aerial image data (block 220d). In either event, the processor 225a, 250a may execute a property risk determination module 220b, 220e, respectively, to determine a property insurance risk based on, for example the aerial image data analysis data (block 225d). Systems and methods of the present disclosure may acquire digital aerial image data from any one of a number of sources (e.g., unmanned drone aircraft or other image-capturing aerial technology). The systems and methods of the present disclosure may use digital aerial image data to perform insurance assessment of, for example, all properties in a limited geographical area (e.g. one zip/postal code) during a limited period of time (e.g. one week). Thereby, the systems and methods of the present disclosure may provide various insurance business processes with actionable information in a timely way for simultaneous use in, for example, the following applications: change detection on a risk, virtual inspections of new property insurance business, virtual property re-inspections of existing insurance business (e.g., for insurance policy renewal automation), virtual property "pre-inspections" of prospective insurance business (e.g., fraud prevention), to aid in identification of property or insurance liability hazards, measurement of defensible space for wildfire exposures, measurement of distance to changing coastlines or riverbanks including seasonal or post-disaster differences (i.e., before mapping services reflect the altered topography), verification of dwelling characteristics (e.g. roof type, siding, roof size, etc.)—potentially used to automate roof-related claims rather than requiring visits from adjusters and/or the purchase of new roof image data, verification of roof shape for wind mitigation, validation of the results of other, traditional property inspection results (e.g., from property inspections from Agents or 3rd Party vendors), and identification of unreported property losses (e.g., property losses while with a prior insurance carrier in the case of new insurance business, or with existing insurance business).

Figure 2E:
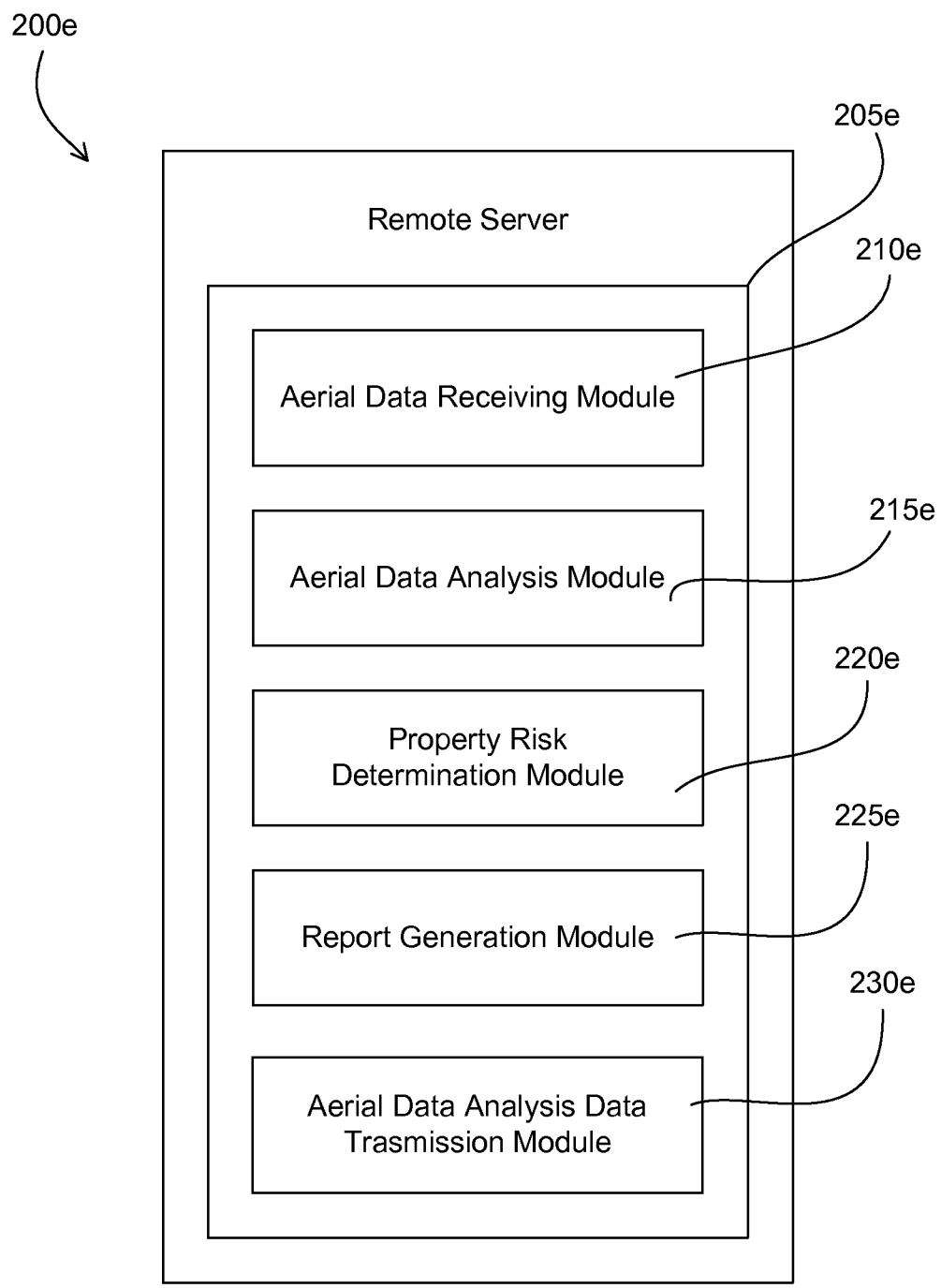
FIG. 2E depicts a block diagram of an example remote computing device.

With reference to FIG. 2E, a remote computing device 200e may include an aerial image data receiving module 210e, an aerial image data analysis module 215e, a property insurance risk determination module 220e, a report generation module 225e, and an aerial data analysis data transmission module 230e stored on, for example, a memory 205e. The remote computing device 200e may be similar to, for example, the remote computing device 210a of FIG. 2A.

Figure 2F:
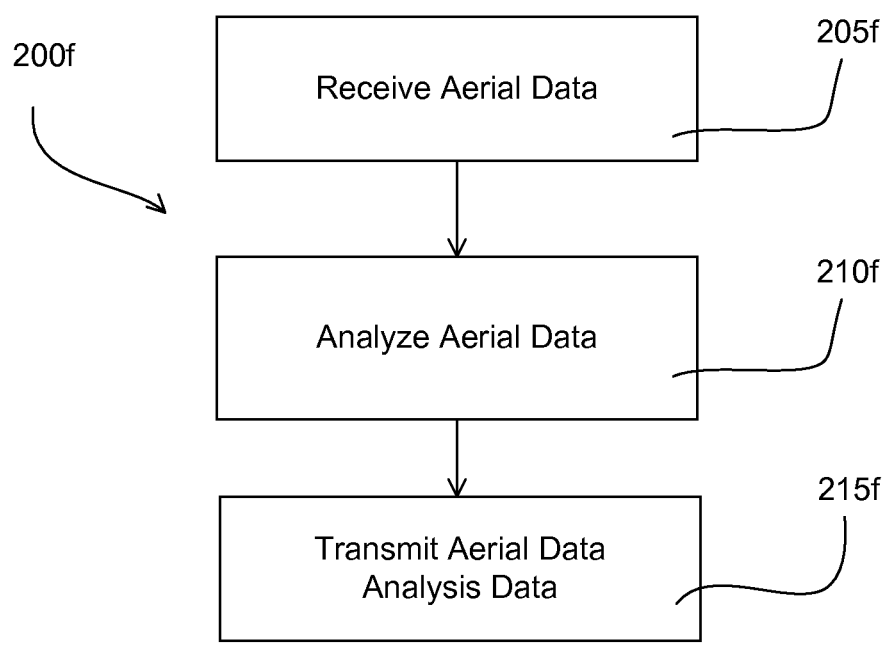
FIG. 2F depicts a flow diagram for an example method of receiving aerial image data, analyzing aerial image data and transmitting aerial image data.

Turning to FIG. 2F, method of receiving aerial image data, analyzing aerial image data and transmitting aerial image data 200f may be implemented by a processor (e.g., processor 250a of remote computing device 210a of FIG. 2A) executing, for example, modules 210e, 215e, 230e of FIG. 2E. In particular, processor 250a may execute an aerial image data receiving module 210e to receive aerial image data at, for example, a remote computing device (e.g., remote computing device 210a of FIG. 2A) from, for example, a client device (e.g., client device 205a of FIG. 2A) (block 205f). The aerial image data may be representative of various property characteristics (e.g., property damage, soil erosion, flood potential, etc.). Timing and geographic scope in which "aerial property insurance risk assessment" is performed may be linked to such factors as, organizational capacity (e.g., if analysis of images is performed manually for any reason), "problem" areas (e.g., new housing developments not yet included in, rural areas not frequented by Agents or Agent Staff for visual recognition of changes in risk), or according to a comprehensive, nation-wide schedule that allows for assessment of every insured or insurable risk within an acceptable timeframe.

Processor 250a may execute an aerial image data analysis module 215e to cause the processor to analyze aerial image data (block 210f). Processor 250a may execute an aerial data analysis data transmission module 230e to transmit aerial image data analysis data from, for example, a remote computing device (e.g., remote computing device 210a of FIG. 2A) to, for example, a client device (e.g., client device 205a of FIG. 2A). The processor 250a may execute a report generation module 225e to cause the processor 250e to generate a property insurance report based, for example, on aerial image data analysis data.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for automatically detecting property changes by tracking physical characteristics of the property using image recognition, the method comprising:

storing, on a memory of a computing device, image data, spatial location data, property characteristic data relating to the image data, an image data receiving module, a spatial location data receiving module, a spatial location data and image data association module, a property characteristic recognition module, and a property change data generation module;

receiving, at a processor of a computing device, spatial location data in response to the processor executing the spatial location data receiving module, wherein the spatial location data is representative of a geographic location of the property;

receiving, at a processor of a computing device, image data, from a digital camera, in response to the processor executing the image data receiving module, wherein the image data is representative of a series of aerial images of property taken from multiple perspectives, and wherein the image data is representative of at least one aerial image that is acquired by an imaging device attached to an unmanned aircraft from less than five-hundred feet above the property;

extracting, using a processor of a computing device, property characteristic data, from the image data, in response to the processor executing the property characteristic recognition module that includes geometric calculations to measure square footage based on information extracted from the image data, wherein the property characteristic data is representative of square footage measurements of the property, the square footage measurements of the property are stored in the property characteristic record as property characteristic data relating to the image data;

associating, using a processor of a computing device, the property characteristic data and the spatial location data, in response to the processor executing the spatial location data and image data association module;

creating the property characteristic record for the property comprising the image data the spatial location data, and the property characteristic data;

storing spatial location data and initial property characteristic data in the property characteristic record, wherein the initial property characteristic data is representative of the property prior to a first property damage claim;

recognizing and tracking property characteristics of the property in the image series as property characteristic data by processing square footage measurements of at least one property characteristic of the property, in response to a processor executing the property characteristic recognition module and adding the property characteristic data to the property characteristic record;

generating, using a processor of a computing device, property change data, based on the property characteristic data, in response to the processor executing a property change data generation module; and automatically updating the property characteristic record with the property characteristic data including the property change data.

2. The method of claim 1, further comprising:

receiving, at a processor of a computing device, property insurance data in response to the processor executing a property insurance data receiving module, wherein the property insurance data is representative of at least one property insurance policy; and correlating, using a processor of a computing device, at least one aerial image with the at least one property insurance policy in response to the processor executing a property insurance correlation module.

3. The method of claim 1, wherein the property change data is representative of at least one of: a change in a property due to a weather related event, a change in a property due to construction activity, a change in a property due to demolition activity, or a change in property due to deterioration.

4. The method of claim 1, further comprising:

receiving, at a processor of a computing device, property insurance claim data in response to the processor executing a property insurance claim data receiving module, wherein the property insurance claim data is representative of an insurance claim; and generating, using a processor of a computing device, property insurance claim settlement data, based on the property change data and the property insurance claim data, in response to the processor executing a property insurance claim settlement data generation module, wherein the property insurance claim settlement data is representative of a settlement of at least one property insurance claim.

5. The method of claim 3, where the settlement of the at least one property insurance claim is reduced because of changes in the property, indicated by the property change data, unrelated to the property insurance claim.

6. A system for automatically detecting property characteristics by tracking physical characteristics of the property using image recognition, the system comprising:

a processor and a memory, wherein image data, spatial location data, property characteristic data relating to the image data, an aerial image data receiving module, a property characteristic recognition module, and a property change data generation module are stored on the memory;

the processor is configured to:

receive spatial location data in response to the processor executing a spatial location data receiving module, wherein the spatial location data is representative of a geographic location of the property;

receive aerial image data in response to the processor executing an aerial image data receiving module, wherein the aerial image data is representative of at least two aerial images of property taken from multiple perspectives, and wherein the aerial image data is representative of at least one aerial image that is acquired by an imaging device attached to an unmanned aircraft from less than five-hundred feet above the property;

extract property characteristic data, from the image data, in response to the processor executing the property characteristic recognition module that includes geometric calculations to measure square footage based on information extracted from the image data, wherein the property characteristic data is representative of square footage measurements of the property, the square footage measurements of the property are stored in the property characteristic record as property characteristic data relating to the image data;

associate the property characteristic data and the spatial location data, in response to the processor executing a spatial location data and image data association module;

create the property characteristic record for the property comprising the image data, the spatial location data, and the property characteristic data;

store initial property characteristic data in the property characteristic record, wherein the initial property characteristic data is representative of the property prior to a first property damage claim;

recognize and track property characteristics of the property in the image series as property characteristic data by processing square footage measurements of at least one property characteristic of the property, in response to a processor executing the property characteristic recognition module and adding the property characteristic data to the property characteristic record;

generate property change data, based on the property characteristic data, in response to the processor executing a property change data generation module; and automatically update the property characteristic record with the property characteristic data including the property change data.

7. The system of claim 6, wherein the property characteristic data is representative of at least one of: a change in a property due to a weather related event, a change in a property due to construction activity, a change in a property due to demolition activity, or a change in property due to deterioration.

8. The system of claim 6, further comprising:
a property insurance claim data receiving module stored on a memory that, when executed by a processor of a computing device, causes the processor to receive property insurance claim data, wherein the property insurance claim data is representative of an insurance claim; and
a property insurance claim settlement data generation module stored on a memory that, when executed by a processor of a computing device, causes the processor to generate property insurance claim settlement data, based on the property change data and the property insurance claim data, wherein the property insurance claim settlement data is representative of a settlement of at least one property insurance claim.

9. The system of claim 8, where the settlement of the at least one property insurance claim is reduced because of changes in the property, indicated by the property characteristic data, unrelated to the property insurance claim.

10. A non-transitory computer-readable medium storing instructions that, when executed by a processor of a computing device, cause the processor to automatically detect property characteristics by tracking physical characteristics of the property using image recognition, the non-transitory computer-readable medium comprising:
image data, spatial location data, property characteristic data relating to the image data, an aerial image data receiving module, a spatial location data receiving module, a spatial location data and image data association module, a property characteristic recognition module, and a property change data generation module;
wherein execution of the spatial location data receiving module by a processor of a computing device, causes the processor to receive spatial location data, wherein the spatial location data is representative of a geographic location of the property;
wherein execution of the aerial image data receiving module by a processor of a computing device, causes the processor to receive aerial image data, wherein the aerial image data is representative of at least two aerial images of property taken from multiple perspectives, and wherein the aerial image data is representative of at least one aerial image that is acquired by an imaging device attached to an unmanned aircraft from less than five-hundred feet above the property;
wherein execution of the property characteristic recognition module, that includes geometric calculations to measure square footage based on information extracted from the image data, causes the processor to extract property characteristic data, from the image data, wherein the property characteristic data is representative of square footage measurements of the property, the square footage measurements of the property are stored in the property characteristic record as property characteristic data relating to the image data;
wherein execution of the spatial location data and image data association module by a processor of a computing device causes the processor to associate the property characteristic data and the spatial location data;
wherein execution of the instructions by a processor causes the processor to create the property characteristic record for the property comprising the image data, the spatial location data, and the property characteristic data;
wherein execution of the instructions by a processor causes the processor to store initial property characteristic data in the property characteristic record, wherein the initial property characteristic data is representative of the property prior to a first property damage claim;
wherein execution of the property characteristic recognition module by a processor, causes the processor to recognize and track property characteristics of the property in the image series as property characteristic data by processing square footage measurements of at least one property characteristic of the property and add the property characteristic data to the property characteristic record;
wherein execution of the property change data generation module by a processor, causes the processor to generate property change data, based on the property characteristic data; and
wherein execution of the instructions by a processor causes the processor to automatically update the property characteristic record with the property characteristic data including the property change data.

11. The non-transitory computer-readable medium of claim 10, further comprising:
a property insurance data generation module that, when executed by a processor of a computing device, causes the processor to generate property insurance data, based on the property characteristic data.

12. The non-transitory computer-readable medium of claim 10, further comprising:
a property insurance data receiving module that, when executed by a processor of a computing device, causes the processor to receive property insurance data, wherein the property insurance data is representative of at least one property insurance policy; and
a property insurance correlation module that, when executed by a processor of a computing device, causes the processor to correlate at least one aerial image with the at least one property insurance policy.

13. The non-transitory computer-readable medium of claim 10, wherein the property characteristic data is representative of at least one of: a change in a property due to a weather related event, a change in a property due to construction activity, a change in a property due to demolition activity, or a change in property due to deterioration.

14. The non-transitory computer-readable medium of claim 10, further comprising:
a property insurance claim data receiving module that, when executed by a processor of a computing device, causes the processor to receive property insurance claim data, wherein the property insurance claim data is representative of an insurance claim; and
a property insurance claim settlement data generation module that, when executed by a processor of a computing device, causes the processor to generate property insurance claim settlement data, based on the property characteristic data and the property insurance claim data, wherein the property insurance claim settlement data is representative of a settlement of at least one property insurance claim.

15. The non-transitory computer-readable medium of claim 14, where the settlement of the at least one property insurance claim is reduced because of changes in the property, indicated by the property characteristic data, unrelated to the property insurance claim.

16. The non-transitory computer-readable medium of claim 10, wherein the property characteristic data is representative of at least one of: deterioration of property roof material, property erosion, or unrepaired property damage associated with a previous insurance claim.

17. The non-transitory computer-readable medium of claim 10, wherein a first series of aerial images are acquired in a first quarter of a calendar year, a second series of aerial images are acquired in a second quarter of the calendar year, a third series of aerial images are acquired in a third quarter of the calendar year, and a fourth series of aerial images are acquired in a fourth quarter of the calendar year.

* * * * *